United States Patent
Roberts et al.

(10) Patent No.: US 11,936,006 B2
(45) Date of Patent: Mar. 19, 2024

(54) BATTERY PACK CIRCUIT BOARD HOLDER

(71) Applicant: Ford Global Technologies, LLC, Dearborn, MI (US)

(72) Inventors: Daniel Paul Roberts, Livonia, MI (US); Francisco Fernandez-Galindo, Canton, MI (US); Aqil Hamid, Canton, MI (US); Benjamin A. Tabatowski-Bush, Ann Arbor, MI (US); George Albert Garfinkel, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 308 days.

(21) Appl. No.: 17/322,974

(22) Filed: May 18, 2021

(65) Prior Publication Data
US 2022/0376308 A1 Nov. 24, 2022

(51) Int. Cl.
*H01M 10/42* (2006.01)
*H01M 10/48* (2006.01)
*H01M 50/204* (2021.01)
*H01M 50/244* (2021.01)
*H01M 50/271* (2021.01)
*H02J 7/00* (2006.01)

(52) U.S. Cl.
CPC ....... *H01M 10/425* (2013.01); *H01M 10/482* (2013.01); *H01M 50/204* (2021.01); *H01M 50/244* (2021.01); *H01M 50/271* (2021.01); *H02J 7/0042* (2013.01)

(58) Field of Classification Search
CPC ............. H01M 10/425; H01M 50/244; H01M 50/204; H01M 50/271; H01M 10/482; H02J 7/0042
See application file for complete search history.

(56) References Cited

U.S. PATENT DOCUMENTS

| | | | |
|---|---|---|---|
| 7,349,214 B2 | 3/2008 | Jeong | |
| 8,169,781 B2 | 5/2012 | Lu | |
| 8,795,869 B2 | 8/2014 | Caumont et al. | |
| 10,070,559 B2 | 9/2018 | Kim | |
| 2010/0247979 A1* | 9/2010 | Ha | H01M 10/48 320/109 |
| 2011/0242766 A1* | 10/2011 | Lu | H05K 7/209 361/720 |
| 2015/0102815 A1* | 4/2015 | Callicoat | G01R 31/396 324/426 |
| 2015/0229007 A1* | 8/2015 | Kim | H01M 10/4257 429/90 |

(Continued)

*Primary Examiner* — Alexander Usyatinsky
(74) *Attorney, Agent, or Firm* — David B. Kelley; Carlson, Gaskey & Olds, P.C.

(57) ABSTRACT

A traction battery assembly includes, among other things, a cover of a battery array, a holder attached to the cover, and a circuit board held by the holder in a position where the circuit board is spaced from the cover. The holder is configured to communicate thermal energy between the circuit board and the cover. A method of securing a circuit board of a traction battery pack includes, among other things, holding a circuit board with a holder, and attaching a holder that is holding the circuit board to a cover of a battery array. The circuit board held by the holder is held in a position where the circuit board is spaced from the cover.

15 Claims, 3 Drawing Sheets

(56) References Cited

U.S. PATENT DOCUMENTS

2016/0028128 A1* 1/2016 Limvorapun ....... H01M 10/615
                                                    429/61
2016/0315366 A1* 10/2016 Wang ..................... B60L 50/64
2017/0200926 A1*  7/2017 Motokawa .......... H01M 10/425
2017/0346144 A1* 11/2017 Addanki ............. H01M 50/271

* cited by examiner

BATTERY PACK CIRCUIT BOARD HOLDER

TECHNICAL FIELD

This disclosure relates generally to securing a circuit board within a battery pack and, more particularly, to a holder that holds the circuit board and manages thermal energy levels within the circuit board.

BACKGROUND

Electrified vehicles differ from conventional motor vehicles because electrified vehicles can be driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

SUMMARY

A traction battery assembly according to an exemplary aspect of the present disclosure includes, among other things, a cover of a battery array, a holder attached to the cover, and a circuit board held by the holder in a position where the circuit board is spaced from the cover. The holder is configured to communicate thermal energy between the circuit board and the cover.

In another exemplary embodiment of the foregoing assembly, the holder includes a floor that is spaced a distance from the cover. The circuit board is attached to the floor of the holder.

In another exemplary aspect of any of the foregoing assemblies, the circuit board is disposed between the floor and the cover.

In another exemplary embodiment of any of the foregoing assemblies, the holder is cup-shaped.

In another exemplary embodiment of any of the foregoing assemblies, the cover is a metal or a metal alloy.

In another exemplary embodiment of any of the foregoing assemblies, the holder is a metal or a metal alloy.

In another exemplary embodiment of any of the foregoing assemblies, the circuit board is a printed circuit board.

Another exemplary embodiment of any of the foregoing assemblies includes mechanical fasteners that secure the holder to the cover.

Another exemplary embodiment of any of the foregoing assemblies includes a thermal interface material between the circuit board and the holder.

In another exemplary embodiment of any of the foregoing assemblies, the holder includes a floor, a rim, and at least one wall extending from the floor to the rim. The circuit board is attached to the floor. The rim is attached directly to the cover with at least one mechanical fastener.

Another exemplary embodiment of any of the foregoing assemblies includes at least one aperture in the floor, the wall, or both.

Another exemplary embodiment of any of the foregoing assemblies includes battery cells at least partially covered by the cover.

In another exemplary embodiment of any of the foregoing assemblies, the circuit board is a circuit board having a battery pack sensing module.

A method of securing a circuit board of a traction battery pack according to another exemplary aspect of the present disclosure includes, among other things, holding a circuit board with a holder, and attaching a holder that is holding the circuit board to a cover of a battery array. The circuit board held by the holder is held in a position where the circuit board is spaced from the cover.

Another exemplary embodiment of the foregoing method includes using a holder to communicate thermal energy between the circuit board and the cover.

In another exemplary embodiment of any of the foregoing methods, the holder is a cup-shaped holder and opens to the cover after the attaching. The circuit board is held within an interior area of the cup-shaped holder.

In another exemplary embodiment of any of the foregoing methods, the circuit board is a printed circuit board.

In another exemplary embodiment of any of the foregoing methods, the circuit board is a circuit board of a battery pack sensing module.

Another exemplary embodiment of any of the foregoing methods includes using a thermal interface material to communicate thermal energy from the circuit board to the holder.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a holder for a circuit board and, in particular, a circuit board of a battery array within a traction battery pack. The holder is configured to "wick" thermal energy from the circuit board, which can help to manage thermal energy within the circuit board.

Figure 1:
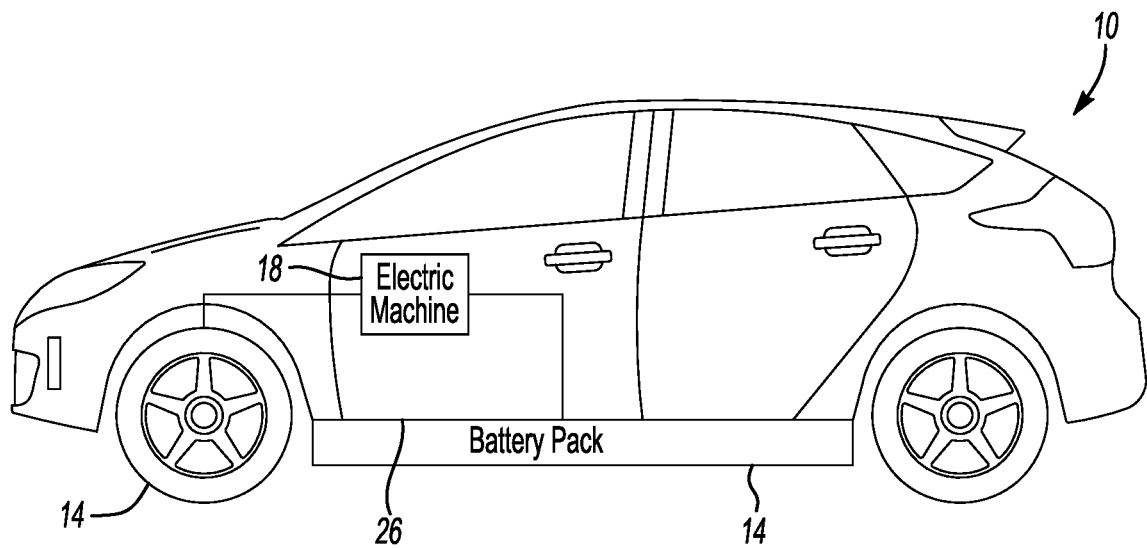
FIG. 1 shows a side view of an electrified vehicle having a battery pack according to an exemplary aspect of the present disclosure.

With reference to FIG. 1, an electrified vehicle 10, in an exemplary non-limiting embodiment, includes a traction battery pack 14 that powers an electric machine 18. The electrified vehicle 10 further includes wheels 22 driven by the electric machine 18. The battery pack 14 can power the electric machine 18, which converts electric power to torque to drive the wheels 22.

The battery pack 14 is, in the exemplary embodiment, secured to an underbody 26 of the electrified vehicle 10. The battery pack 14 could be located elsewhere on the electrified vehicle 10 in other examples. The battery pack 14 can be secured to the underbody 26 using straps and mechanical fasteners, for example.

The electrified vehicle 10 is an all-electric vehicle. In other examples, the electrified vehicle 10 is a hybrid electric vehicle, which can selectively drive wheels using torque provided by an internal combustion engine instead, or in addition to, an electric machine. Generally, the electrified vehicle 10 could be any type of vehicle having a traction battery pack.

Figure 2:
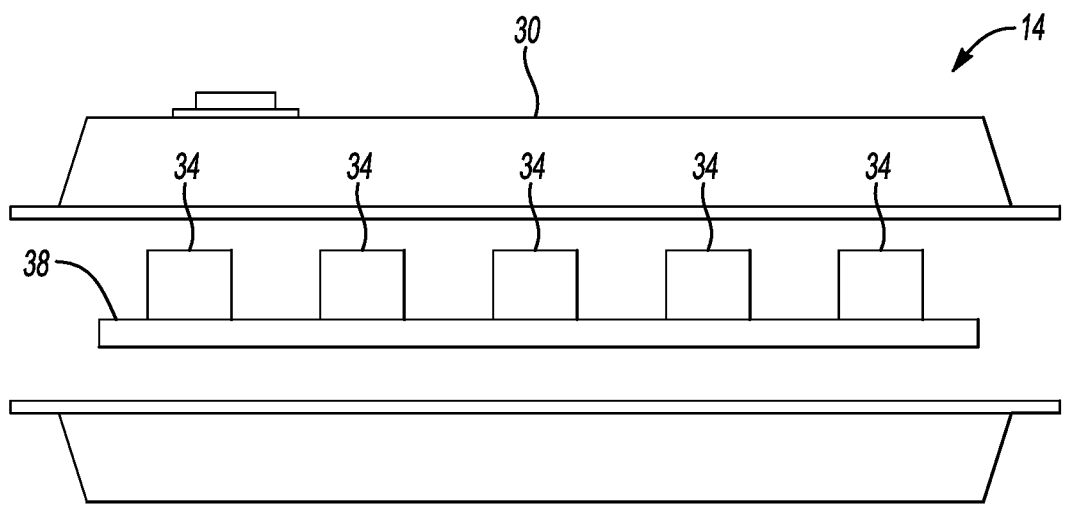
FIG. 2 illustrates a partially expanded view of the battery pack from FIG. 1.

Referring now to FIG. 2, the battery pack 14 includes an enclosure 30 that encloses a plurality of battery arrays 34 and a cold plate 38. The battery arrays 34 are disposed on the cold plate 38. A liquid coolant can circulate through the cold plate 38 to cool the battery arrays Referring now to FIGS. 3-5 with continuing reference to FIGS. 1 and 2, the arrays 34 each include a plurality of individual battery cells 42 disposed along an axis A between opposing end plates 46. Side plates 50 are disposed along opposing laterally facing sides of the battery cells 42. A top plate 54 covers the upper surfaces 56 of the battery cells 42. Terminals 58 of the battery cells 42 extend through the upper surfaces 56 of the battery cells 42 in this example. For purposes of this disclosure, "upper" is with reference to ground and an ordinary orientation of the battery cells 42 when the battery pack 14 is within the electrified vehicle 10 of FIG. 1.

The top plate 54 is a cover because the top plate 54 covers at least the upper surfaces 56 of the battery cells 42. The end plates 46 and side plates 50 are also covers in this example.

The battery pack 14 can include various modules and connectors utilized to communicate and monitor the individual battery cells 42 and other areas of the battery array 34. As examples, the battery pack 14 can include a battery management system that include a battery pack sensing module (BPSM) and a battery energy control module (BECM).

Many battery packs now incorporate distributed battery management systems to measure and monitor battery cell voltage, current, temperature, etc. Distributed battery management systems include components, such as the BPSM, mounted directly to the battery arrays 34.

For example, a battery pack having a distributed architecture can include circuitry mounted to individual battery arrays. The circuitry is connected to sense leads associated with that battery array. In contrast, a battery pack having a centralized architecture may extend sense leads from each of the battery arrays all the way to a centralized BPSM that contains circuitry.

In this example, the battery pack 14 has a distributed architecture and includes battery management system electronics mounted to the top plate 54 of each of the battery arrays 34. The electronics can be used to measure and monitor status information such as voltage, current, temperature, etc.

The battery management system of the battery pack 14 can balance the battery cells 42 by selectively adjusting a state of charge of one or more battery cells 42 within a given one of the battery arrays 34 to bring the state of charge closer to other battery cells 42 within that battery array 34. Resistors can be used to help balance the battery cells 42.

In the past, cell balance resistors have been housed in a central BECM that has sufficient cooling capability to reject the generated heat energy. The distributed architecture of the battery pack 14 can mean that resistors used in balancing are secured to the battery array 34 rather than housed in a centralized control module that is located within the battery pack 14, but spaced from the battery arrays 34.

Figure 3:
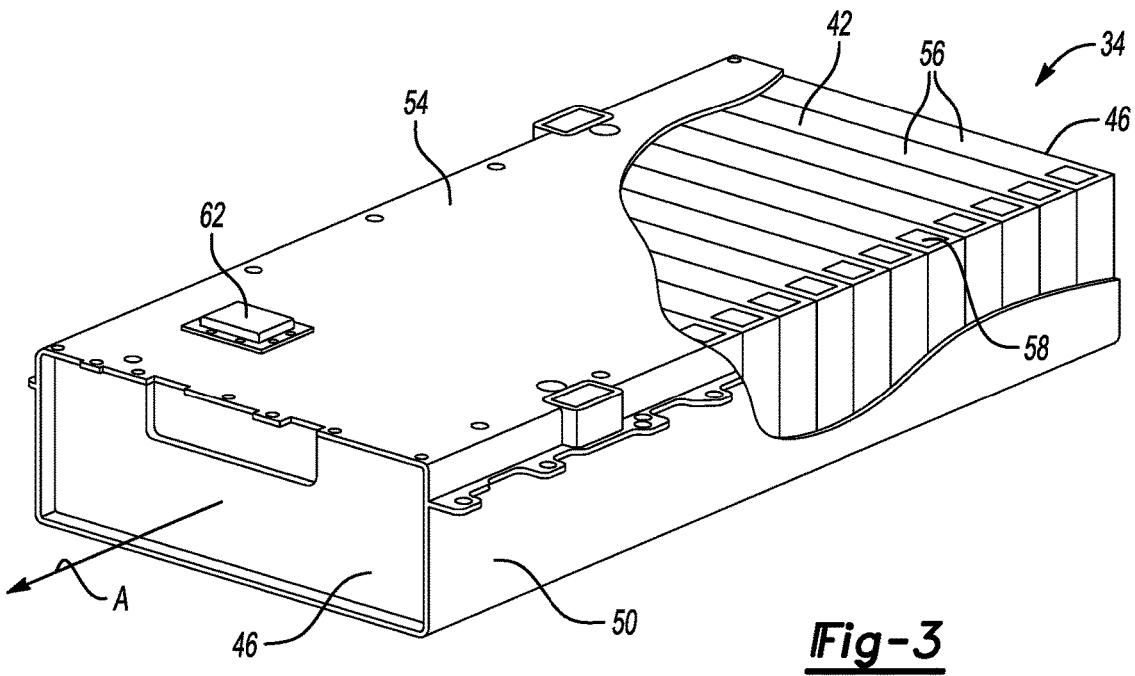
FIG. 3 illustrates a perspective view of a battery array from a battery pack of FIGS. 1 and 2.
Figure 4:
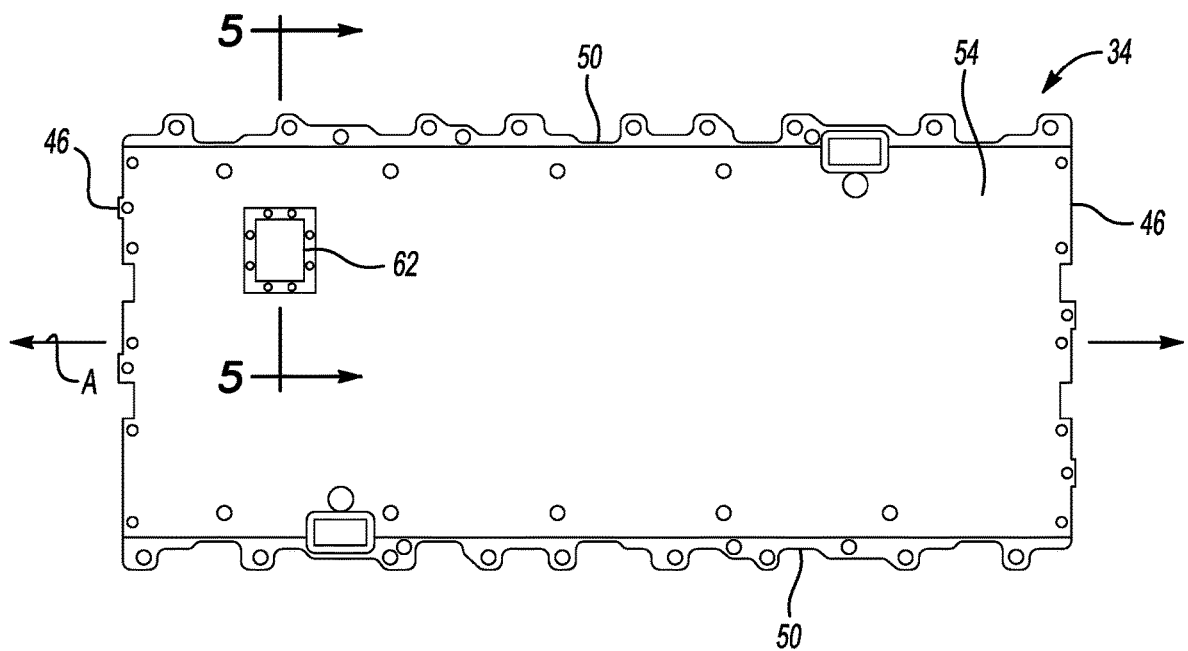
FIG. 4 illustrates a top view of the battery array of FIG. 3.
Figure 5:
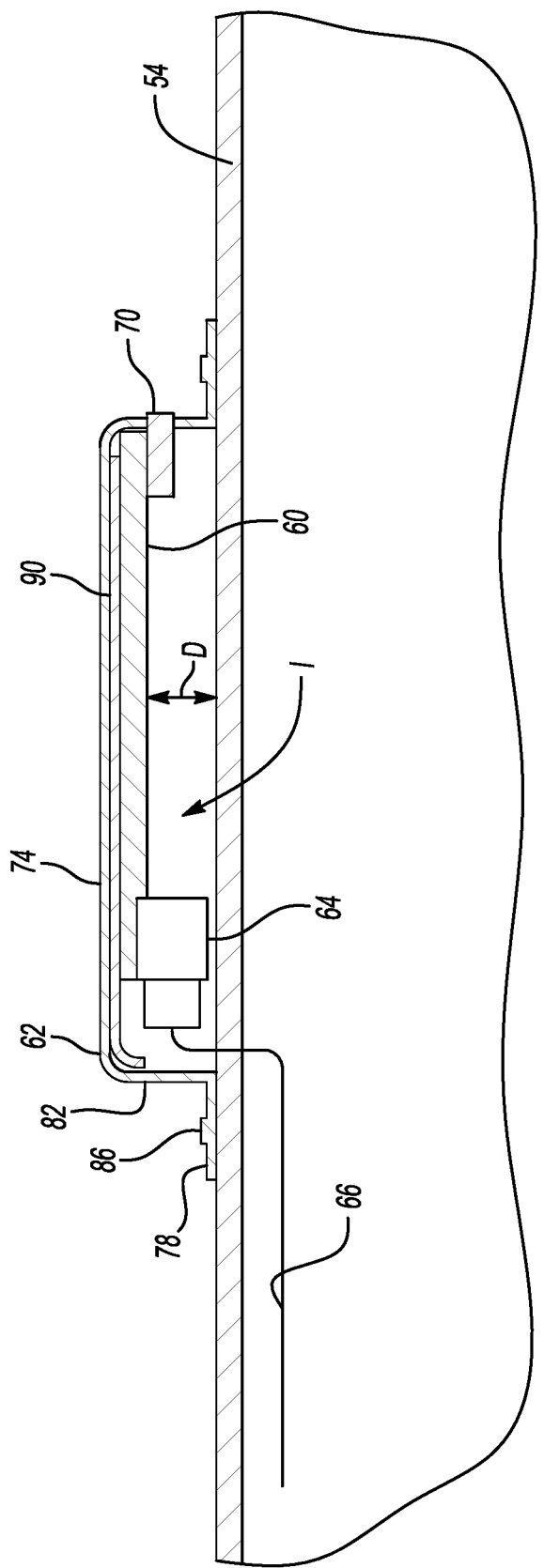
FIG. 5 illustrates a section view taken at line 5—in FIG. 4.

In this example, the battery management system includes a circuit board 60 mounted to the battery array 34 via a holder 62. The circuit board 60 is not remote from the battery array 34, but is secured to the battery array 34 through the holder 62. The circuit board 60 can include, among other things, the resistors utilized to balance the state of charge of the battery cells 42 within the battery array 34. One of the battery arrays 34 is shown in FIGS. 3-5. The other battery arrays 34 in the battery pack 14 is configured similarly to the battery array 34 of FIG. 3-5.

The circuit board 60 can be an FR-4 type printed circuit board. The circuit board 60 is coupled to and sensing connectors 64 that connects to a flexible printed circuit board 66 that extends through the top plate 54 into an interior area of the battery array 34. The printed circuit board 66 can be a flexible printed circuit board.

The circuit board 60, in the exemplary embodiment, is coupled to another connector 70. The connector 70 can be a communication connector utilized to "daisy chain" together the circuit board 60 of one of the arrays 34 with another circuit board on another of the arrays 34.

During operation, thermal energy levels within the circuit board 60 can increase due to, among other things, the operation of the resistors of the circuit board. The holder 62 is configured to communicate thermal energy between the circuit board 60 and the cell array top plate 54. In particular, the holder 62 takes on thermal energy from the circuit board 60 and communicates that thermal energy to the top plate 54. This can help to prevent the circuit board 60 from overheating.

The holder 62 holds the circuit board 60 at a position where the circuit board 60 is elevated a distance D above the top plate 54 to provide an air gap between the circuit board 60 and the top plate 54. The air gap can facilitate air flow to further help radiate thermal energy from the circuit board 60. Elevating the circuit board 60 away from the top plate 54 also electrically isolates the circuit board 60.

The holder 62 includes a floor 74, an attachment rim 78, and at least one wall 82 extending from the floor 74 to the attachment rim 78. The holder 62 is cup-shaped in this example. The holder 62 can be considered a heatspreader as the holder 62 spreads heat from the circuit board 60 to the top plate 54.

A plurality of mechanical fasteners 86 are used to secure the holder 62 to the top plate 54. The mechanical fasteners 86 extend through the attachment rim 78 to engage the top plate 54. The mechanical fasteners can be rivets or bolts, for example.

The holder 62, in this example, is a metal or metal alloy material. The holder 62 can be stamped or drawn from a sheet of material to provide the cup-shaped profile. The holder 62 can be another type of thermally conductive alloy in another example.

The holder 62 is inverted when secured to the top plate 54 and substantially encloses the circuit board 60 within the interior area I. The holder 62 can help to block fingers or other items from contacting the circuit board 60.

A thermal interface material 90 is used to secure the circuit board 60 to the floor 74 of the holder 62. During operation, as thermal energy levels increase within the circuit board 60, thermal energy moves through the thermal interface material 90 to the floor 74 of the holder 62.

The thermal energy passes from the floor 74 through the walls 82 to the attachment rim 78. Thermal energy then moves to the top plate 54.

The top plate 54 can be a metal or metal alloy, In the exemplary embodiment, the top plate 54 is aluminum. The top plate 54 can be another type of thermally conductive alloy in another example. Moving the thermal energy from the circuit board 60 to the top plate 54 reduces thermal energy levels within the circuit board 60. Thermal energy can radiate away from the top plate 54 or communicate into another structure, such as the cold plate 38 (FIG. 2).

Although shown as secured to the top plate 54, the holder 62 could be secured to other covers of the battery array 34 in other examples, such as the end plates 46 or the side plates 50.

Servicing of the printed circuit board 60 or related components can, in some examples, occur with some level of modularity. Servicing procedures can, for example, involve disengaging the mechanical fasteners 86. The holder 62 can then be to be moved away from the top plate 54 and the connectors 64, 70 disengaged. A replacement circuit board can then be installed.

Features of the disclosed examples includes retaining a circuit board in a way that facilitates thermal conductivity with a circuit board while also electrically isolating the circuit board. The example BPSM heatspreader provides a robust mounting solution while providing electrical isolation and thermal conductivity The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery assembly, comprising:
    a cover of a battery array;
    a holder attached to the cover, the holder including a floor, a rim, and at least one wall extending from the floor to the rim; and
    a circuit board held by the holder in a position where the circuit board is spaced from the cover, the holder configured to communicate thermal energy between the circuit board and the cover, the circuit board mounted to the floor of the holder, the rim attached to the cover of the holder.

2. The traction battery assembly of claim 1, wherein the circuit board is attached to the floor of the holder via a thermal interface material.

3. The traction battery assembly of claim 2, wherein the circuit board is disposed between the floor and the cover.

4. The traction battery assembly of claim 1, wherein the holder is cup-shaped.

5. The traction battery assembly of claim 1, wherein the cover is a metal or metal alloy.

6. The traction battery assembly of claim 5, wherein the holder is a metal or metal alloy.

7. The traction battery assembly of claim 6, wherein the circuit board is a printed circuit board.

8. The traction battery assembly of claim 1, further comprising a plurality of mechanical fasteners that secure the holder to the cover.

9. The traction battery assembly of claim 1, further comprising a thermal interface material between the circuit board and the holder.

10. The traction battery assembly of claim 1, wherein the rim is attached directly to the cover with at least one mechanical fastener.

11. The traction battery assembly of claim 10, further comprising at least one aperture in the floor, the at least one wall, or both.

12. The traction battery assembly of claim 1, further comprising a plurality of battery cells at least partially covered by the cover.

13. The traction battery assembly of claim 1, wherein the circuit board is a circuit board of a battery pack sensing module.

14. A traction battery assembly, comprising:
    a cover of a battery array;
    a cup-shaped holder having an attachment rim, the cup-shaped holder attached to the cover through the attachment rim; and
    a circuit board held by the cup-shaped holder in a position where the circuit board is spaced from the cover, the cup-shaped holder configured to communicate thermal energy between the circuit board and the cover.

15. The traction battery assembly of claim 14, wherein the attachment rim is secured directly to the cover with at least one mechanical fastener.

* * * * *